(12) United States Patent
Ding et al.

(10) Patent No.: US 10,963,620 B1
(45) Date of Patent: Mar. 30, 2021

(54) BUFFER INSERTION TECHNIQUE TO CONSIDER EDGE SPACING AND STACK VIA DESIGN RULES

(71) Applicant: Cadence Design Systems, Inc., San Jose, CA (US)

(72) Inventors: Yi-Xiao Ding, Austin, TX (US); Jhih-Rong Gao, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/735,662

(22) Filed: Jan. 6, 2020

(51) Int. Cl.
*G06F 30/398* (2020.01)
*G06F 30/3947* (2020.01)
*G06F 30/392* (2020.01)
*G06F 30/3953* (2020.01)
*G06F 111/04* (2020.01)
*G06F 117/10* (2020.01)

(52) U.S. Cl.
CPC .......... *G06F 30/398* (2020.01); *G06F 30/392* (2020.01); *G06F 30/3947* (2020.01); *G06F 30/3953* (2020.01); *G06F 2111/04* (2020.01); *G06F 2117/10* (2020.01)

(58) Field of Classification Search
CPC .............. G06F 30/3947; G06F 30/392; G06F 30/3953; G06F 2117/10; G06F 30/398; G06F 2111/04
See application file for complete search history.

(56) References Cited

U.S. PATENT DOCUMENTS

| 2002/0184607 | A1* | 12/2002 | Alpert | G06F 30/392 |
| | | | | 716/114 |
| 2003/0217348 | A1* | 11/2003 | Nonaka | G06F 30/39 |
| | | | | 716/114 |
| 2008/0072202 | A1* | 3/2008 | Alpert | G06F 30/367 |
| | | | | 716/114 |
| 2018/0232481 | A1* | 8/2018 | Berry | G06F 30/394 |

* cited by examiner

*Primary Examiner* — Stacy Whitmore
(74) *Attorney, Agent, or Firm* — Schwegman Lundberg & Woessner, P.A.

(57) ABSTRACT

Aspects of the present disclosure address improved systems and methods for buffer insertion in an integrated circuit (IC) design using a cost function that accounts for edge spacing and stack via constraints associated with cells in the IC design. An integrated circuit (IC) design comprising a routing topology for a net is accessed. A set of candidate insertion locations along the routing topology are identified. A set of buffering candidates is generated based on the candidate insertion locations. A buffering candidate comprises a cell inserted at a candidate insertion location along the routing topology. A cost associated with the buffering candidate is determined based on a number of potential edge spacing conflicts and a number of stack vias associated with the cell. A buffering solution for the net is selected from the buffering candidate based on the cost associated with the buffering candidate.

20 Claims, 7 Drawing Sheets

BUFFER INSERTION TECHNIQUE TO CONSIDER EDGE SPACING AND STACK VIA DESIGN RULES

TECHNICAL FIELD

The present disclosure generally relates to the technical field of integrated circuit design. In particular, the present disclosure addresses techniques for buffer insertion in view of edge spacing and stack via design rules.

BACKGROUND

An integrated circuit (IC) comprises cells of similar and/or various sizes, and connections between or among the cells. A cell includes several pins interconnected by wires to pins of one or more other cells. A net includes interconnections between a set of pins to form connections between or among the pins. An IC design may include multiple nets. A design netlist specifies the connections between the pins.

Design engineers design IC's by transforming circuit descriptions of the IC's into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and devices on IC's. For instance, EDA tools commonly use rectilinear lines to represent the wire segments that interconnect the IC components. These tools also represent electronic and circuit IC components as geometric objects with varying shapes and sizes.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

Placement and routing are key operations in the physical design cycle and are often referred to collectively as a "place and route" stage. During placement, exact locations are assigned to various components within an IC's core area. Further optimizations are often performed to fix timing an design rule violations in the design. EDA applications often include buffer insertion engines that insert buffers or inverters at exact locations while optimizing circuit characteristics according to design rules. A buffering engine takes a synthesized netlist together with a technology library and produces a placement layout.

Routing is generally divided into two phases: global routing and detailed routing. For each net, global routing generates a routing topology that includes an approximate routing path for the interconnect lines that are to connect the pins of the net. After the routing topology has been created, detailed routing creates specific individual routes for each net.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, place and route is a typical stage in integrated circuit (IC) design. After place and route, a design rule violation (DRV) stage is often performed to fix DRVs (e.g., a maximum capacitance violation, a maximum fanout violation, or a maximum transition violation) in an IC design. In advanced technology nodes, buffer insertion is a common approach for DRV and timing fixing. Van Ginneken's algorithm is a frequently used technique to perform bottom-up buffer insertion. Van Ginneken's algorithm and other conventional approaches use a dynamic programming approach to evaluate whether a buffer or inverter is to be inserted into one of potentially many candidate insertion locations in the design based on a cost function that seeks to minimize "costs" resulting from inserting the buffer or inverter into the design. These "costs" may, for example, include a chip area utilized by an inserted buffer or inverter. Although these conventional techniques seek to fix deficiencies with respect to certain design rules such as slew constraints, these conventional techniques fail to account for other rules and constraints that may be associated with a design.

For example, certain advanced technology cells may have an associated edge space constraint that specifies a particular spacing (i.e., a distance) between two cells. An edge spacing rule may be associated with a particular cell type and may specify a spacing constraint between the cell type and any other cell type. In some instances, an edge spacing rule may specify a particular spacing between two specific cell types. In some instances, an edge spacing rule may be more specific in that it specifies a spacing between particular boundaries of particular cell types. For example, a first cell type may have an associated edge spacing rule that specifies an edge spacing between a right boundary of the first cell type and a left boundary of a second cell type. As another example, one or more cells in a design may have an associated stack via rule that defines a stack via constraint that specifies a number of stack vias to be used for pin access for the cell. Conventional techniques for buffer insertion do not account for edge spacing and stack via constraints, and as a result, may produce sub-optimal buffering solutions that may lead to further design constrain violations or other issues in down-stream operations during the IC design flow.

Aspects of the present disclosure address problems with the conventional approaches to buffer insertion during electronic design automation (EDA), among others, with a design process that includes utilizing a cost function during buffer insertion that accounts for edge spacing and stack via rules associated with cells in the design. Given a net with a routing topology, an EDA system divides the net into multiple placement bins where each bin comprises a portion of the net. A total number of potential edge spacing conflicts are determined for each placement bin based on a number of edge spacing constraints that cells in each placement bin are subject to. A total number of stack vias are determined for each placement bin based on stack via constraints associated with cells in each placement bin. Additionally, an average number of potential edge spacing conflicts and an average number of stack vias are determined for the net.

Several points along the routing topology of the net are selected as candidate locations for inserting a buffer or inverter and a set of buffering candidates are generated based on the candidate insertion locations. Each buffering candidate specifies a particular candidate insertion location along with a buffer or inverter of a particular type inserted at the candidate insertion location. The EDA system uses a cost function to determine a cost associated with each buffering candidate based on edge spacing constraints and stack via constraints associated with the buffer or inverter type specified by the buffering candidate as well as the total number of potential conflicts and stack vias for the placement bin and the average number of potential conflicts and stack vias for the net. The EDA system selects a buffering solution from the set of buffering candidates based on the determined costs.

Accounting for edge spacing and stack via constraints in this manner provides several benefits including improving efficiency of placement legalization later in the design process flow. This approach also avoids moving buffers/inverters too far away from a legalized placement, thereby preserving timing and DRV fixes in the design.

Figure 1:
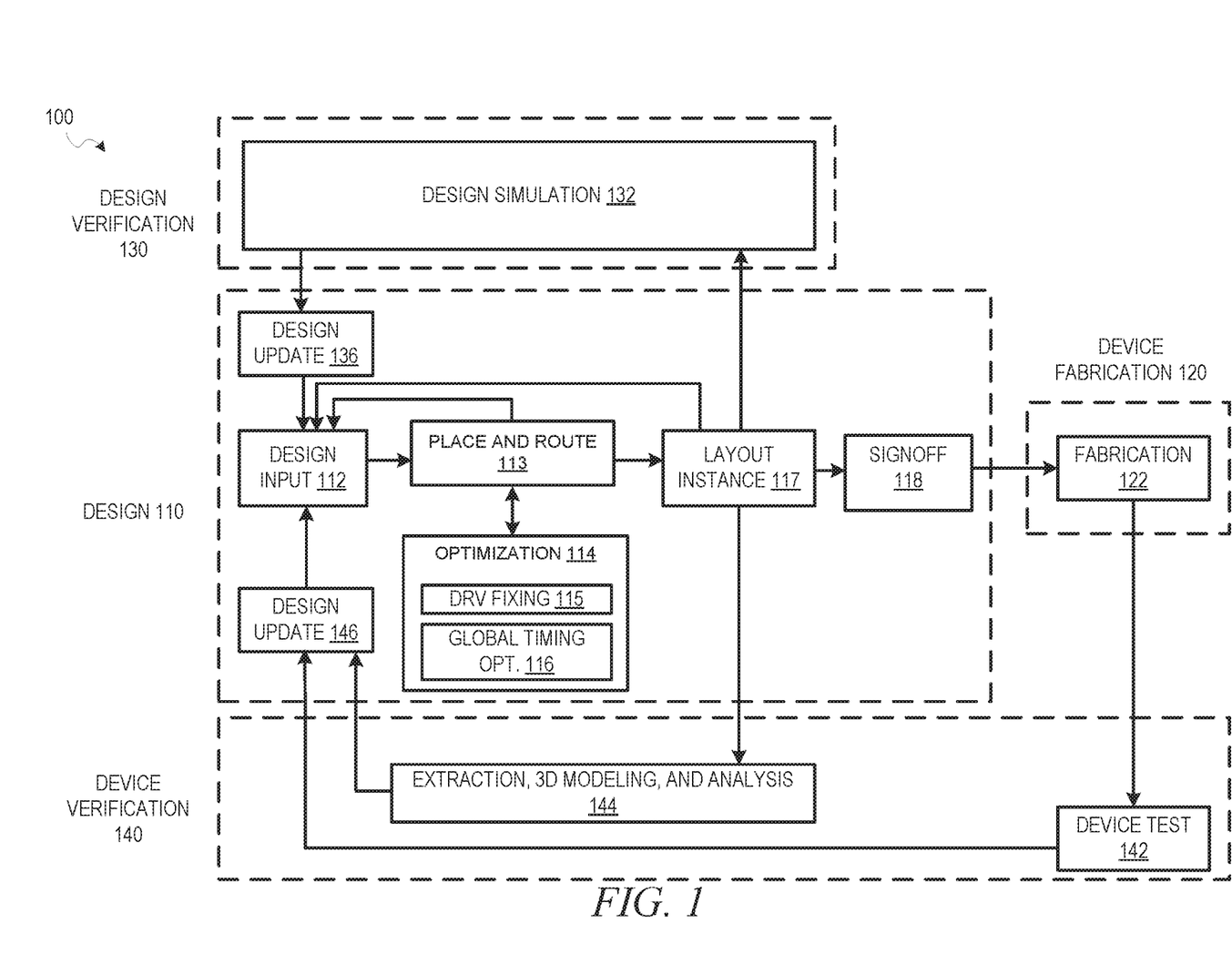
FIG. 1 is a diagram illustrating an example design process flow that includes a buffer insertion operation that accounts for edge spacing and stack via constraints, according to some embodiments.

FIG. 1 is a diagram illustrating an example design process flow that includes a buffer insertion operation that accounts for edge spacing and stack via constraints, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, placement, and timing analysis are performed in a place and route 113 operation, and optimization is performed in an optimization 114 operation along with any other automated design processes. While the design process flow 100 shows place and route 113 and optimization 114 occurring prior to a layout instance 117, routing, placement, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the optimization 114 operation includes a design rule violation (DRV) fixing 115 operation and a global timing optimization 116 operation. During the DRV fixing 115 and global timing optimization 116 operations, DRVs and timing in the design are fixed using a variety of approaches including buffer insertion. For example, given a net with a routing topology, several points along the routing topology of the net are selected as candidate locations for inserting a buffer or inverter. A set of buffering candidates are generated based on the candidate insertion locations. For example, the design process flow 100 may utilize one or more cell libraries that provide multiple cell types including multiple buffer and inverter types to generate the buffering candidates. Buffering candidates may be generated by inserting various cell types at each candidate insertion location. Each buffering candidate indicates a particular candidate insertion location along with a buffer or inventor of a particular type inserted at the candidate insertion location.

As part of the buffer insertion stage, the net is split into multiple placement bins where each bin comprises a portion of the net. A total number of potential edge spacing conflicts are determined for each placement bin based on a number of edge spacing constraints that cells in each placement bin are subject to. A total number of stack vias are determined for each placement bin based on stack via constraints associated with cells in each placement bin. Additionally, an average number of potential edge spacing conflicts and an average number of stack vias are determined for the net.

A cost function is used during buffer insertion to determine a cost associated with each buffering candidate based on edge spacing constraints and stack via constraints associated with the buffer or inverter type specified by the buffering candidate as well as the total number of potential conflicts and stack vias for the placement bin and the average number of potential conflicts and stack vias for the net. A buffering solution is selected from the set of buffering candidates based on the determined costs.

After design inputs are used in the design input 112 operation to generate a circuit layout, and any of the routing and optimization 114 operations are performed, a layout is generated in the layout instance 117. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132; a design update 146 from the device test 142 or the extraction, 3D modeling, and analysis 144 operations; or the design input 112 operation may occur after the initial layout instance 117 is generated. In various embodiments, whenever design inputs are used to update or change an aspect of a circuit design, a timing analysis and the routing and optimization 114 operation may be performed.

Figure 2:
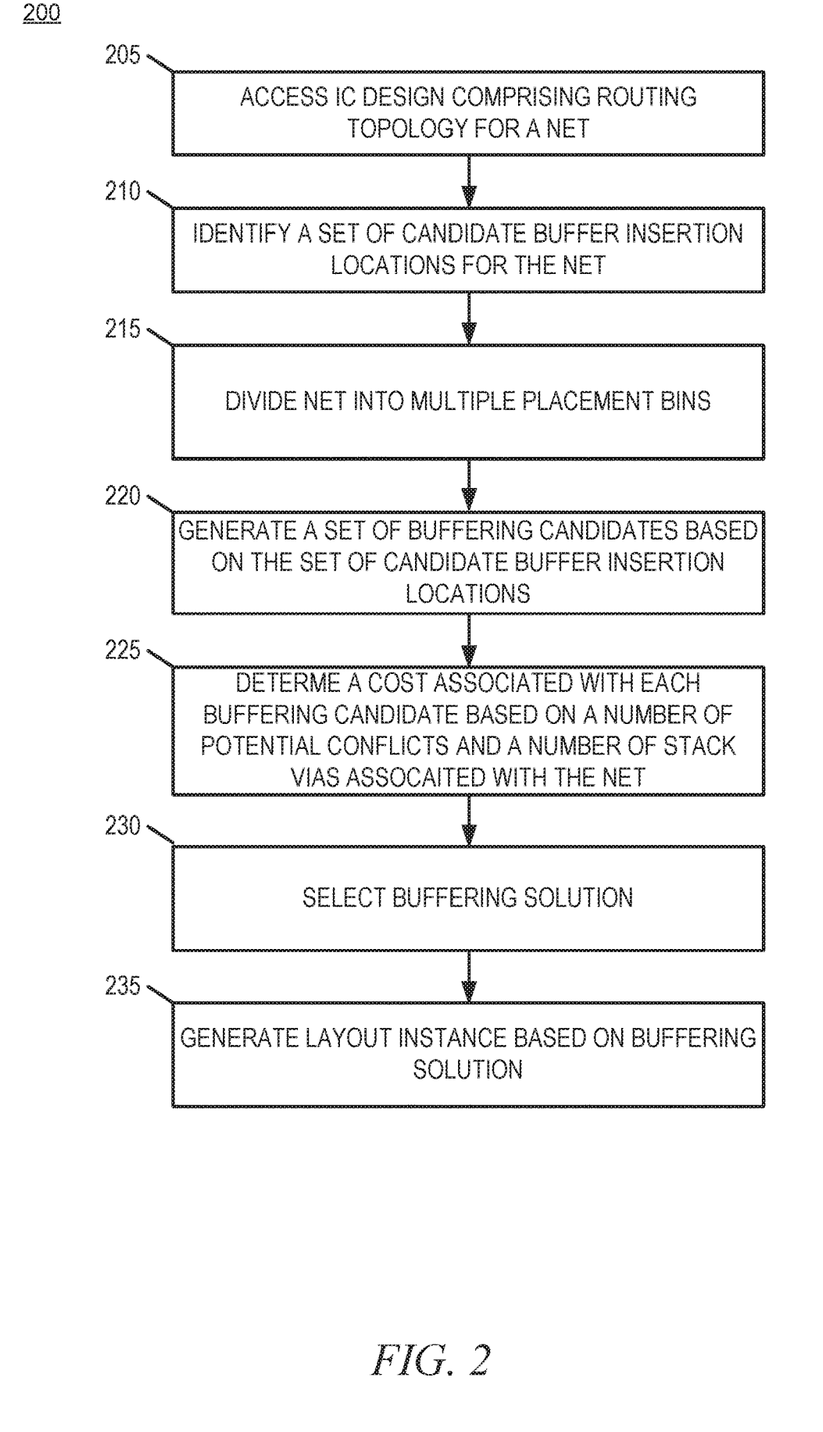
FIGS. 2-3 are flowcharts illustrating operations of a method for buffer insertion in an IC design that accounts for edge spacing and stack via constraints, according to some embodiments.
Figure 3:
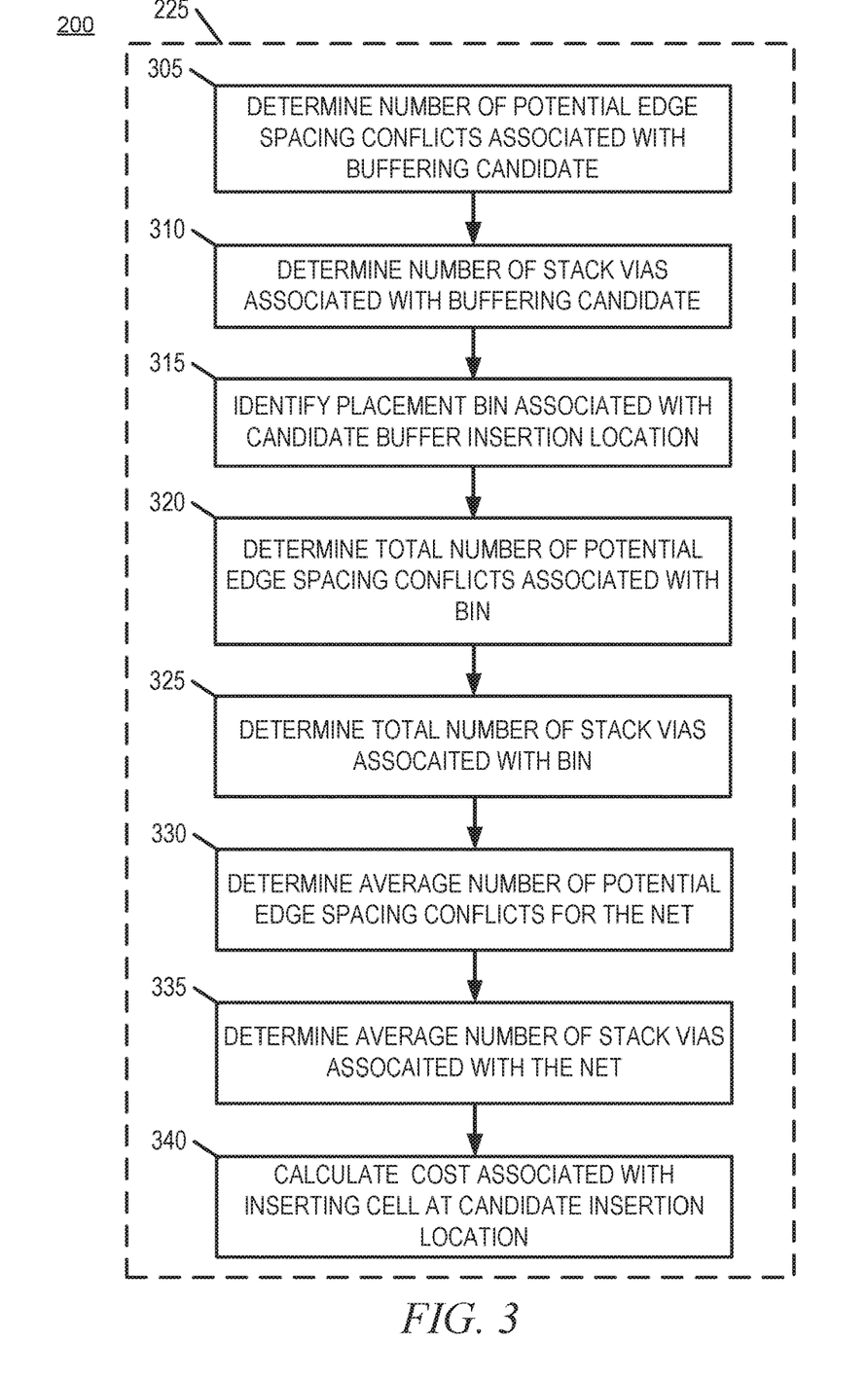

FIGS. 2-3 are flowcharts illustrating operations of a method 200 for buffer insertion in an IC design that accounts for edge spacing and stack via design rules, according to some embodiments. For some embodiments, the method 200 is performed as part of a place and route process applied to a circuit design (e.g., by an EDA software system).

It will be understood that the method 200 may be performed by a computing device, such as a computing device executing instructions of an EDA software system. For example, the operations of a method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below in reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

At operation 205, the computing device accesses an integrated circuit (IC) design from memory. The IC design comprises a net and a routing topology for the net. The routing topology comprises routing paths for interconnections between pins of the net. One or more cells in the net may be associated with one or more edge spacing constraints and/or one or more stack via constraints.

The computing device, at operation 210, identifies a set of candidate insertion locations along the routing topology of the net. Each candidate insertion location corresponds to a point on a routing path of the routing topology. Points on the routing path that are within placement blockages are excluded from the set of candidate insertion locations and may be marked as unbufferable.

The computing device divides, at operation 215, the net into multiple placement bins (e.g., multiple 10×10 circuit rows). Each placement bin comprises a portion of the net and accordingly may comprise one or more cells. One or more candidate insertion locations can be within a given placement bin.

The computing device generates a set of buffering candidates for the net based on the set of candidate insertion locations (operation 220). Each buffering candidate comprises a cell inserted at an insertion location from among the candidate insertion locations. More specifically, each buffering candidate specifies an insertion location selected from the candidate insertion locations and a cell type (e.g., a buffer type or an inverter type) inserted at the insertion location. Accordingly, in generating the set of buffering candidates, the computing device may access one or more cell libraries and insert various cell types from the one or more cell libraries at each candidate insertion location. That is, a buffering candidate may be generated for each cell type at each candidate insertion location. The one or more cell libraries may provide multiple buffer types and multiple inverter types. Buffer and inverter types may vary by area and power consumption, and buffer and inverter types may have different edge spacing and stack via constraints.

In generating the set of buffer candidates, the computing device may, for example, utilize Van Ginneken's algorithm to perform bottom-up buffer insertion. In doing so, the computing device tries to insert each available buffer or inverter type at each candidate buffer insertion location. During this operation, a pruning procedure may performed to delete redundant partial solutions or solutions that violate design constraints. This operation is performed in a bottom-up manner along the net and the source is reached, the set of buffer candidates are generated.

As an example, a first buffering candidate may be generated by inserting a first type of buffer into a first candidate insertion location along the routing path. A second buffering candidate may be generated by inserting a second type of buffer into the first candidate insertion location. A third buffering candidate may be generated by inserting the first type of buffer into a second candidate insertion location. A fourth buffering candidate may be generated by inserting the second type of buffer into the second candidate insertion location. In addition to differing in area and power, the first and second type of buffer may be associated with different edge spacing constraints and different stack via constraints.

At operation 225, the computing device determines a cost associated with each buffering candidate using a cost function. As noted above, a buffering candidate specifies an insertion location on the routing topology of the net along with a cell type (e.g., an inverter or buffer type) inserted at the location. The computing device uses the cost function to determine the cost of a given buffering candidate based on a number of potential edge spacing conflicts associated with inserting the cell type at the candidate insertion location and a number of stack vias associated with the cell type. The computing device determines the number potential edge spacing conflicts associated with inserting the cell type at the candidate insertion location based on one or more edge spacing constraints associated with the cell type or other cells already in the net. The computing device determines the number of stack vias associated with the cell type based on a stack via constraint associated with the cell type.

As an example, as shown in FIG. 3, the operation 225 may comprise operations 305, 310, 315, 320, 325, 330, 335, and 340. Although the operations 305, 310, 315, 320, 325, 330, 335, and 340 are described above in terms of a single buffering candidate, it shall be appreciated that the operations 305, 310, 315, 320, 325, 330, 335, and 340 can be repeated such that a cost is determined for each buffering candidate. As noted above, each buffering candidate specifies a cell type among multiple supported cell types and a candidate buffer insertion location at which the cell type is inserted. Accordingly, operations 305, 310, 315, 320, 325, 330, 335, and 340 may be repeated for multiple cell types at each candidate insertion location.

The computing device, at operation 305, determines a number of potential edge spacing conflicts associated with the buffering candidate. The number of potential edge spacing conflicts associated with the buffering candidate result from insertion of a specified cell type at the candidate insertion location corresponding to the buffering candidate. The computing device determines the number of potential edge spacing conflicts associated with the cell type being inserted at the candidate insertion location by counting a number of edge spacing constraints to which the cell type is subject at the candidate insertion location.

The computing device determines a number of stack vias associated with the buffering candidate, at operation 310. The computing device determines the number of stack vias associated with the buffering candidate based on a stack via constraint associated with the specified cell type.

At operation 315, the computing device identifies a placement bin associated with the candidate insertion location of the buffering candidate. As noted above, the computing device divides the net into multiple placement bins. The computing device identifies the placement bin associated with the candidate insertion location by identifying the placement bin within which the candidate insertion location is located.

The computing device determines, at operation 320, a total number of potential edge spacing conflicts associated with the placement bin and a total number of stack vias associated with the placement bin, at operation 325. The computing device determines the total number of potential edge spacing conflicts associated with the placement bin based on a number of edge spacing constraints that cells in the placement bin are subject to. The computing device determines the total number of stack vias associated with the placement bin based on one or more stack via constraints associated with cells in the placement bin. More specifically, the computing device counts a number of stack vias specified by the one or more stack via constraints associated with cells in the placement bin.

The computing device determines an average number of potential edge spacing conflicts (at operation 330) associated with the net and an average number of stack vias associated with the net, at operation 335. The computing device determines the average number of potential edge spacing conflicts based on the number of edge spacing constraints that cells in the net are subject to and the total number of cells in the net. The computing device determines the average number of potential edge spacing conflicts based on stack via constraints associated with cells in the net and the total number of cells in the net.

At operation 340, the computing device calculates a cost associated with the buffering candidate using the cost function. In doing so, the computing device determines a cost associated with inserting the cell type at the candidate insertion location. The computing device determines the cost based in part on: the number of potential edge spacing conflicts associated with the buffering candidate, the number of stack vias associated with the buffering candidate, the total number of potential edge spacing conflicts associated with the placement bin, the total number of stack vias associated with the placement bin, the average number of potential edge spacing conflicts associated with the net, and the average number of stack vias associated with the net. For example, the computing device may utilize the following cost function in calculating the cost associated with inserting a buffer or inverter at the candidate insertion location:

$$\text{Cost} = \text{Norm.Cost} * \left(1 + \alpha \frac{(\#con_{buf} + \#con_{bin})}{\text{averge net } con} + \beta \frac{(\#sv_{buf} + \#sv_{bin})}{\text{averge net } sv}\right)$$

where Norm.Cost is the normalized cost associated with inserting the cell based on an area of the cell, $\alpha$ and $\rho$ are tunable design parameters (predefined default values may be used), $\#con_{buf}$ is the number of potential edge spacing conflicts associated with the buffering candidate, $\#sv_{buf}$ is the number of stack vias associated with the buffering candidate, $\#con_{bin}$ is the total number of potential edge spacing conflicts associated with the placement bin, $\#sv_{bin}$ is the total number of stack vias associated with the placement bin, averge net con is the average number of potential edge spacing conflicts associated with the net, and averge net sv is the average number of stack vias associated with the net.

Referring back to FIG. 2, at operation 230, the computing device selects a buffering solution from the set of buffering candidates based on respective costs of the set of buffering candidates. For example, the computing device may select the buffering candidate with the lowest cost as the buffering solution. In selecting a buffering solution, the computing device may further verify that design constraints such as slew targets are satisfied by a buffering candidate. That is, the computing device may select the buffering candidate with the lowest cost that also satisfies the slew target.

At operation 235, the computing device generates a design layout instance for the IC device design based in part on the buffering solution. The layout describes the physical layout dimensions of the IC device. In generating the design layout instance, the computing device performs one or more routing processes to interconnect components of the net using the routing paths of the routing topology.

FIGS. 4A-4E are conceptual diagrams illustrating an example buffer insertion process, according to some embodiments. It will be understood that the process illustrated in FIGS. 4A-4E may be performed by a computing device, such as a computing device executing instructions of an EDA software system. For example, the process may be performed as part of a place and route process applied to a circuit design by an EDA software system.

Figure 4A:
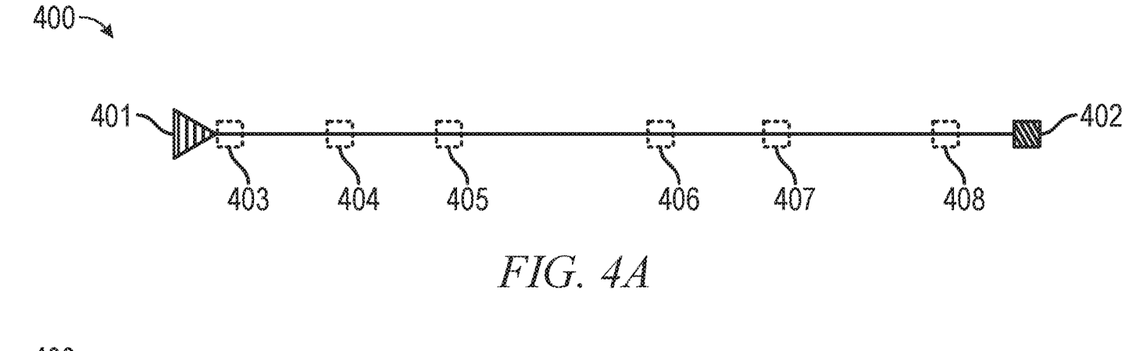
FIGS. 4A-4E are conceptual diagrams illustrating an example buffer insertion process, according to some embodiments.

With reference to FIG. 4A, a net 400 with a routing topology is shown. The net 400 comprises a root pin 401, a sink 402, and a routing path connecting the root pin 401 to the sink 402. Candidate insertion locations 403-408 are shown along the routing path.

Figure 4B:
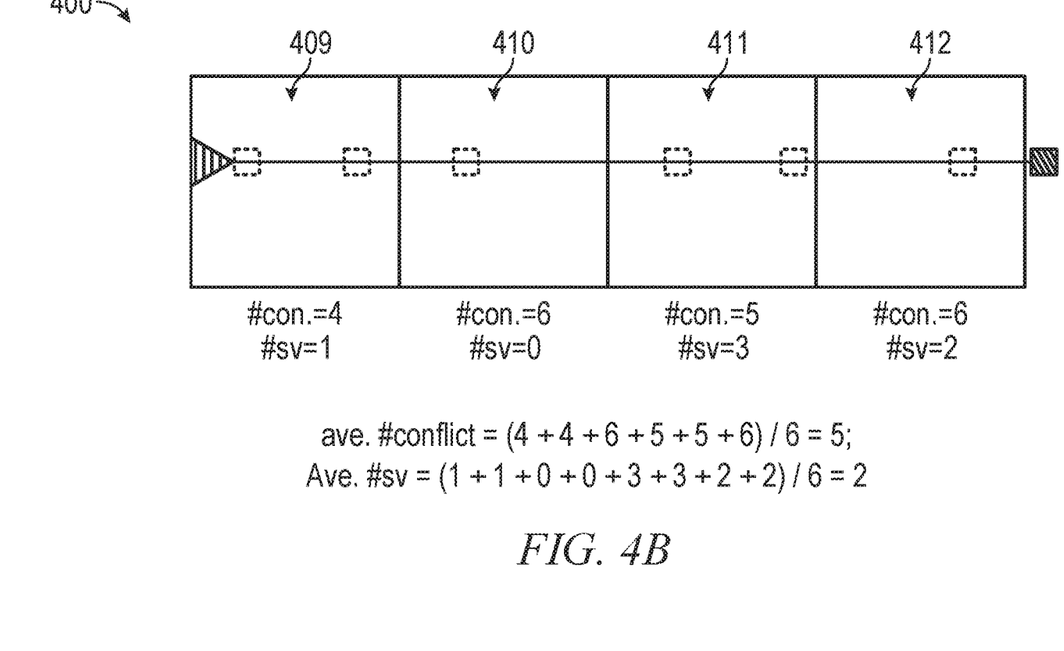

With reference to FIG. 4B, the net 400 is divided into multiple placement bins-bins 409-412. As noted above, the computing device determines a total number of potential edge spacing conflicts (represented in the FIG. 4B as "# con") and total number of stack vias for each placement bin (represented in the FIG. 4B as "# sv"). As shown, for placement bin 409, the number of potential conflicts is 4 and the total number of stack vias is 1; for placement bin 410, the number of potential conflicts is 6 and the total number of stack vias is 0; for placement bin 411, the number of potential conflicts is 5 and the total number of stack vias is 3; and for placement bin 412, the number of potential conflicts is 6 and the total number of stack vias is 2.

As also noted above, the computing device determines an average number of potential edge spacing conflicts and an average number of stack vias associated with the net 400. In this example, the average number of potential edge spacing conflicts for the net 400 is 5 ((4+4+6+5+5+6)/6) and the average number of stack vias associated with the net 400 is 5/3 ((1+1+0+3+3+2)/6).

Figure 4C:
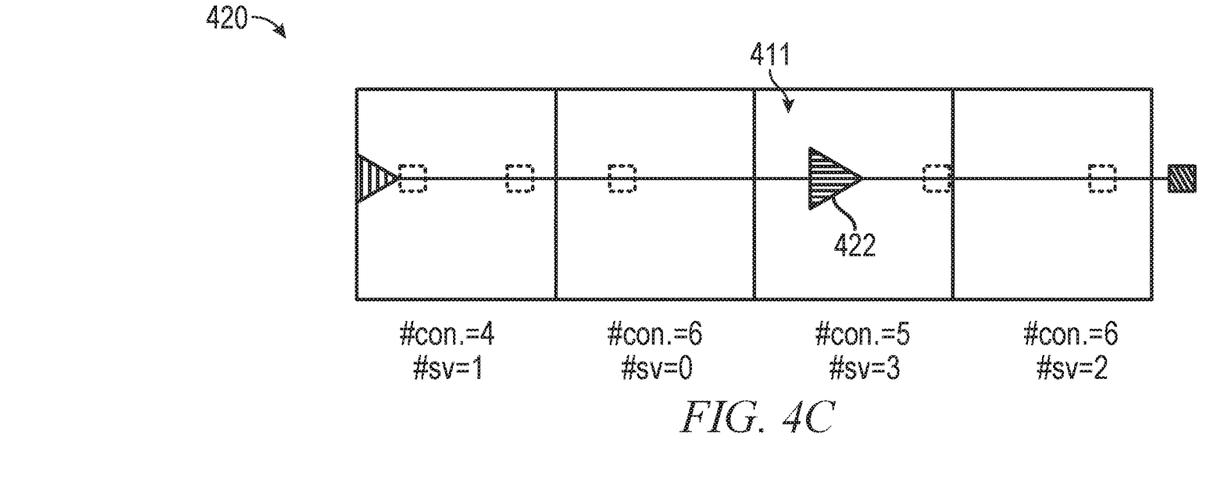
Figure 4D:
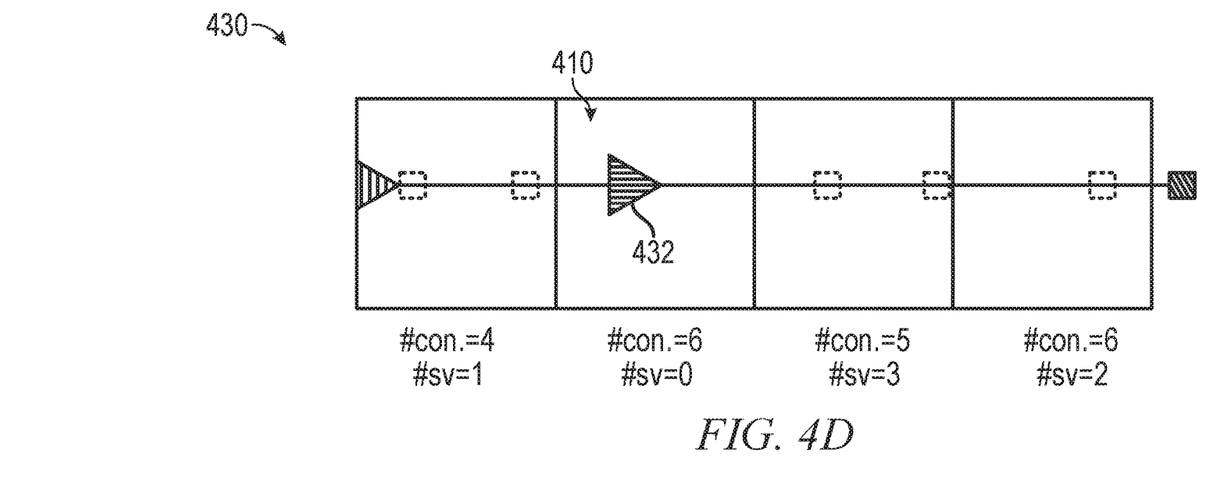
Figure 4E:
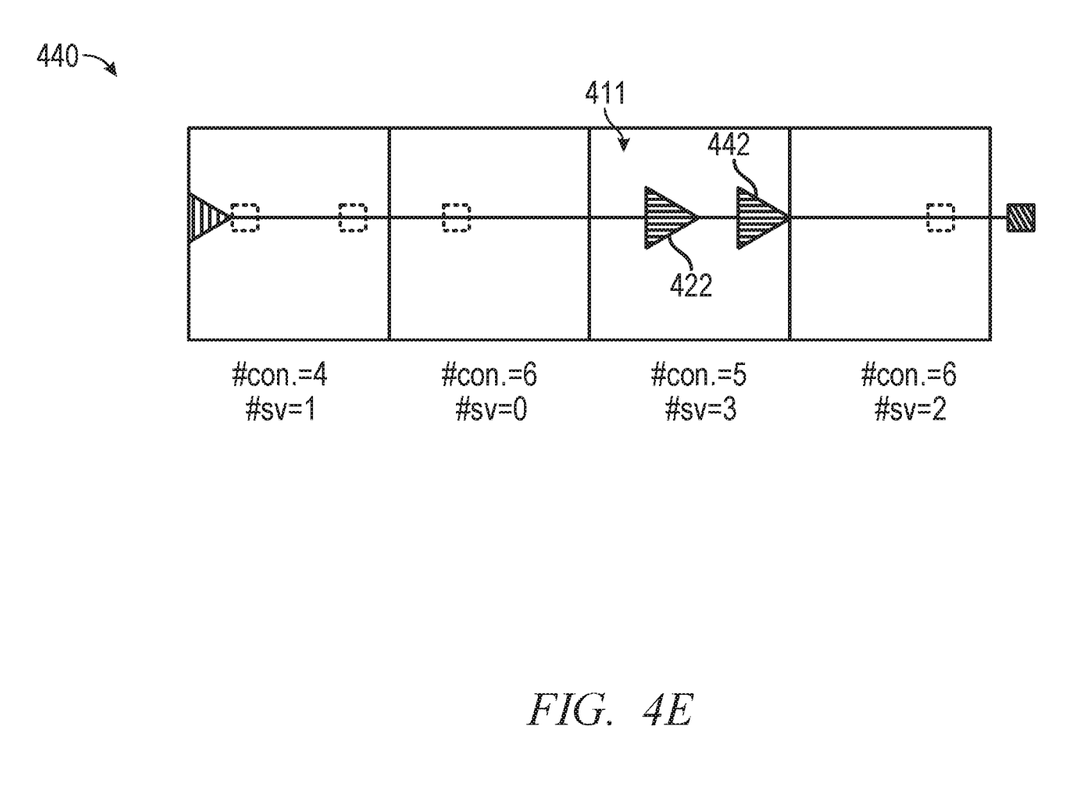

With reference to FIG. 4C, a buffering candidate 420 is illustrated. The buffering candidate 420 comprises the net 400 with a buffer 422 inserted at location 406 within placement bin 411. With reference to FIG. 4D, a buffering candidate 430 is illustrated. The buffering candidate 430 comprises the net 400 with a buffer 432 inserted at location 405 within placement bin 410. With reference to FIG. 4E, a buffering candidate 440 is illustrated. The buffering candidate 440 comprises the net 400 with the buffer 422 inserted at location 406 (similar to candidate 420) as well as a buffer 442 inserted at location 407 within placement bin 411.

The computing device may evaluate the buffering candidates 420, 430, and 440, among others, to determine a buffering solution for the net 400. The computing device may evaluate the buffering candidates 420, 430, and 440 and select the buffering solution based on a cost associated with each buffering candidate. Assuming the buffer 422 is associated with 6 potential edge spacing conflicts and 1 stack via and has a normalized cost of 2, by applying the above referenced cost function to this example, the cost associated with buffering candidate 420 may be expressed as follows:

$$Cost=2*[1+alpha*(6+5)/5)+beta*(1+3)/(5/3)]$$

Assuming the buffer 432 is also associated with 6 potential edge spacing conflicts and 1 stack via and has a normalized cost of 2, the cost associated with buffering candidate 430 may be expressed as follows:

$$Cost=2*[1+alpha*(6+6)/5)+beta*(1+0)/(5/3)]$$

With buffering candidate 440, the computing device evaluates the potential edge spacing conflicts associated with inserting the buffer 442 in view of both existing cells in placement bin 411 as well as the other candidate buffer 422. Assuming the buffer 442 is associated with 7 potential edge spacing conflicts (1 additional in view of buffer 422) and 1 stack via and has a normalized cost of 2 and, the cost associated with buffering candidate 430 may be expressed as follows:

$$Cost=2*[1+alpha*(6+5+1)/5)+beta*(1+3)/(5/3)]$$

Figure 5:
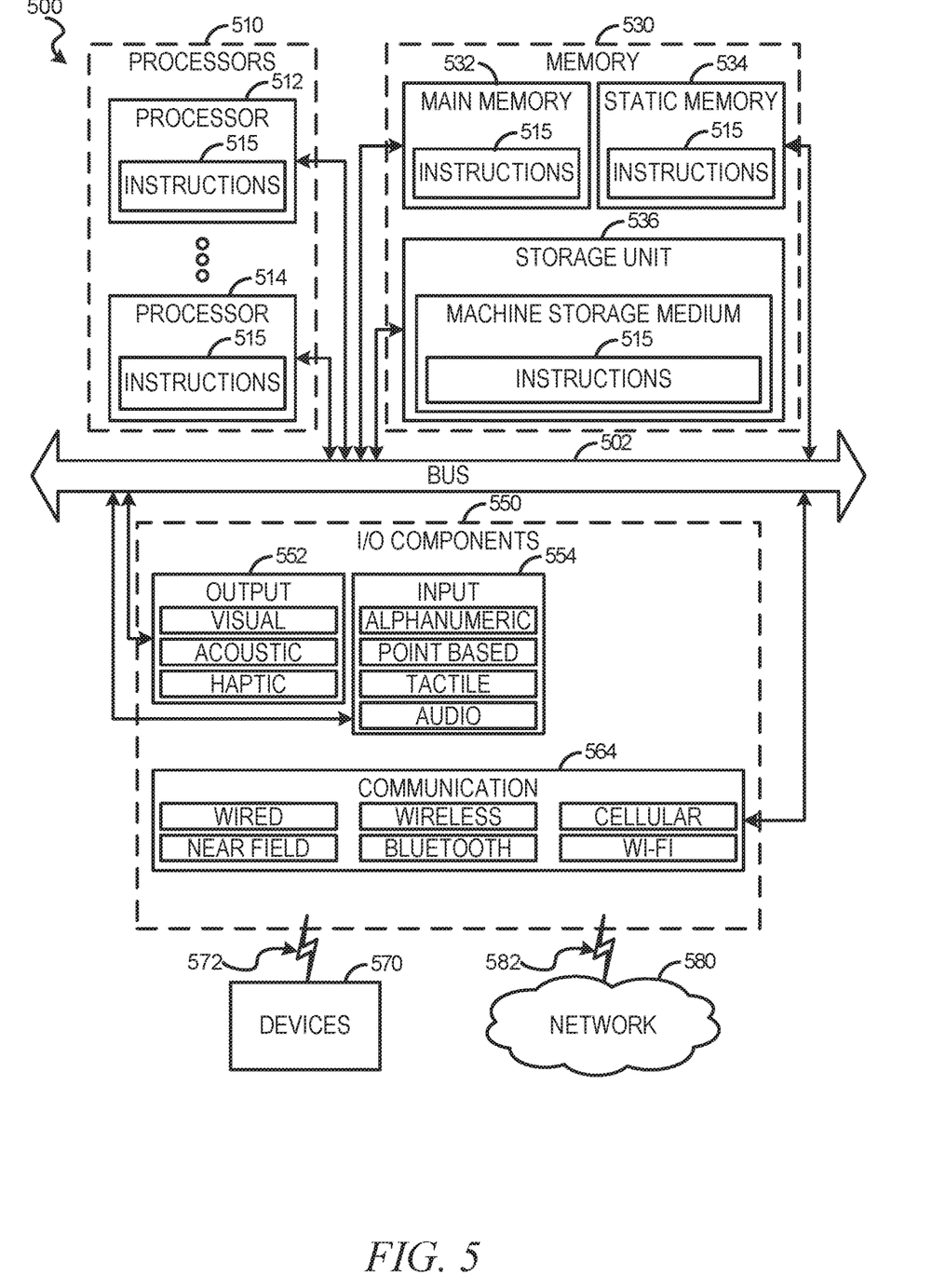
FIG. 5 is a diagrammatic representation of a machine in the example form of a computer system within which a set of instructions for causing the machine to perform any one or more of the methodologies discussed herein may be stored and executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 515 (e.g., software, a program, an application, an applet, an app, or other executable code) for causing the machine 500 to perform any one or more of the methodologies discussed herein may be executed. For example, the instructions 515 may correspond to an EDA software system that causes the machine 500 to execute the method 200. Additionally, or alternatively, the instructions 515 may implement FIGS. 1 and 4A-4D. The instructions 515 transform the general, non-programmed machine 500 into a particular machine 500, such as an EDA system, programmed to carry out the described and illustrated functions in the manner described here. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 515, sequentially or otherwise, that specify actions to be taken by the machine 500. Further, while only a single machine 500 is illustrated, the term "machine" shall also be taken to include a collection of machines 500 that individually or jointly execute the instructions 515 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 515. The term "processor" is intended to include multi-core processors 510 that may comprise two or more independent processors (sometimes referred to as "cores") that may execute instructions 515 contemporaneously. Although FIG. 5 shows multiple processors 510, the machine 500 may include a single processor with a single core, a single processor with multiple cores (e.g., a multi-core processor), multiple processors with a single core, multiple processors with multiple cores, or any combination thereof.

The memory 530 may include a main memory 532, a static memory 534, and a storage unit 536, both accessible to the processors 510 such as via the bus 502. The main memory 532, the static memory 534, and the storage unit 536 store the instructions 515 embodying any one or more of the methodologies or functions described herein. The instructions 515 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, and other communication components to provide communication via other modalities. The devices 570 may be another machine or any of a wide variety of peripheral devices (e.g., a peripheral device coupled via a universal serial bus (USB)).

Executable Instructions and Machine Storage Medium

The various memories (e.g., 530, 532, 534, and/or memory of the processor(s) 510) and/or the storage unit 536 may store one or more sets of instructions and data structures (e.g., software) embodying or utilized by any one or more of the methodologies or functions described herein. These instructions, when executed by the processor(s) 510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media, "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 515 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 515 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 515 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A electronic design automation (EDA) system comprising:
   one or more processors of a machine; and
   a computer storage medium storing instructions, which when executed by the machine, cause the machine to perform operations comprising:
   accessing, from memory, an integrated circuit (IC) design comprising a routing topology for a net, the net comprising interconnections between a set of pins, the routing topology comprising routing paths for the interconnections between the set of pins;
   identifying a set of candidate insertion locations along the routing topology;
   generating a set of buffering candidates based on the set of candidate insertion locations, a buffering candidate from the set of buffering candidates comprises a cell inserted at a candidate insertion location from among the set of candidate insertion locations along the routing topology;
   determining, using a cost function, a cost associated with the buffering candidate based on a number of potential edge spacing conflicts associated with the buffering candidate and a number of stack vias associated with the buffering candidate, the determining of the cost associated with the buffering candidate comprising:
   determining the number of potential edge spacing conflicts associated with the buffering candidate based on one or more edge spacing constraints associated with the cell; and
   determining the number of stack vias associated with the buffering candidate based on a stack via constraint associated with the cell;
   selecting the buffering candidate from the set of buffering candidates as a buffering solution for the net based on the cost associated with the buffering candidate; and
   generating a layout instance for the IC design based in part on the buffering solution, the layout instance describing physical layout dimensions of the IC.

2. The EDA system of claim 1, wherein: the selecting of the buffering candidate from the set of buffering candidates is based on the buffering candidate having a lowest cost among the set of buffering candidates.

3. The EDA system of claim 1, wherein the one or more edge spacing constraints and the stack via constraint are associated with the cell based on a type of the cell, the buffering candidate specifying the type of the cell.

4. The EDA system of claim 1, wherein:
   the operations further comprise dividing the net into multiple placement bins, and
   the determining of the cost associated with the buffering candidate further comprises:
   identifying a placement bin in which the candidate insertion location is located;
   determining a total number of potential edge spacing conflicts associated with the placement bin based on additional edge spacing constraints associated with cells in the placement bin; and
   determining a total number of stack vias associated with the placement bin based on one or more stack via constraints associated with the cells in the placement bin,
   the determining of the cost associated with the buffering candidate being further based on the total number of potential edge spacing conflicts associated with the placement bin and the total number of stack vias associated with the placement bin.

5. The EDA system of claim 4, wherein determining the number of potential edge spacing conflicts associated with the placement bin comprises:
   counting a number of edge spacing constraints to which cells in the placement bin are subject.

6. The EDA system of claim 4, wherein determining the number of stack vias associated with the placement bin comprises:
   counting a number of stack vias specified by the one or more stack via constraints associated with cells in the placement bin.

7. The EDA system of claim 1, wherein determining the cost associated with the buffering candidate further comprises:
   determining an average number of potential edge spacing conflicts associated with the net; and
   determining an average number of stack vias associated with the net,
   the determining of the cost associated with the buffering candidate being further based on the average number of potential edge spacing conflicts associated with the net and the average number of stack vias associated with the net.

8. The EDA system of claim 1, wherein the operations further comprise:
   determining a cost associated with each buffering candidate, wherein the selecting of the buffering candidate from the set of buffering candidates as the buffering solution for the net is based on the cost associated with each buffering candidate.

9. The EDA system of claim 8, wherein:
   the buffering candidate is a first buffering candidate;
   the cell is a first cell of a first cell type;

the candidate insertion location is a first candidate insertion location; and the set of buffering candidates comprises:
a second buffering candidate comprising a second cell of a second cell type inserted at the first candidate insertion location along the routing topology; and
a third buffering candidate comprising a third cell of the first cell type inserted at a second candidate insertion location along the routing topology.

10. The EDA system of claim 1, wherein the selecting of the buffering solution further comprises:
verifying a slew target is satisfied by the buffering solution.

11. A method for electronic design automation, the method comprising:
accessing, from memory, an integrated circuit (IC) design comprising a routing topology for a net, the net comprising interconnections between a set of pins, the routing topology comprising routing paths for the interconnections between the set of pins;
dividing the net into multiple placement bins;
generating, using one or more hardware processors, a set of buffering candidates based on the routing topology, a buffering candidate from the set of buffering candidates comprising a cell inserted at a candidate insertion location from among a set of candidate insertion locations along the routing topology;
identifying a placement bin within which the candidate insertion location is located;
determining, using a cost function, a cost associated with the buffering candidate based on a total number of potential edge spacing conflicts associated with the placement bin and a total number of stack vias associated with the placement bin, the determining of the cost associated with the buffering candidate comprising:
determining the total number of potential edge spacing conflicts associated with the placement bin based on edge spacing constraints associated with cells in the placement bin; and
determining the total number of stack vias associated with the placement bin based on one or more stack via constraints associated with the cells in the placement bin;
selecting the buffering candidate from the set of buffering candidates as a buffering solution for the net based on the cost associated with the buffering candidate; and
generating a layout instance for the IC design based in part on the buffering solution, the layout instance describing physical layout dimensions of the IC.

12. The method of claim 11, wherein determining the cost associated with the buffering candidate further comprises:
determining a number of potential edge spacing conflicts associated with the buffering candidate based on one or more edge spacing constraints associated with the cell; and
determining a number of stack vias associated with the buffering candidate based on a stack via constraint associated with the cell,
the determining of the cost associated with the buffering candidate being further based on the number of potential edge spacing conflicts associated with the buffering candidate and the total number of stack vias associated with the buffering candidate.

13. The method of claim 12, wherein the one or more edge spacing constraints and the stack via constraint are associated with the cell based on a type of the cell, the buffering candidate specifying the type of the cell.

14. The method of claim 11, wherein: the selecting of the buffering candidate from the set of buffering candidates is based on the buffering candidate having a lowest cost among the set of buffering candidates.

15. The method of claim 14, wherein determining the total number of potential edge spacing conflicts associated with the placement bin comprises:
counting a number of edge spacing constraints to which cells in the placement bin are subject.

16. The method of claim 14, wherein determining the total number of stack vias associated with the placement bin comprises:
counting a number of stack vias specified by the one or more stack via constraints associated with cells in the placement bin.

17. The method of claim 11, wherein determining the cost associated with the buffering candidate further comprises:
determining an average number of potential edge spacing conflicts associated with the net; and
determining an average number of stack vias associated with the net,
the determining of the cost associated with the buffering candidate being further based on the average number of potential edge spacing conflicts associated with the net and the average number of stack vias associated with the net.

18. The method of claim 11, further comprising:
determining a cost associated with each buffering candidate, wherein the selecting of the buffering candidate from the set of buffering candidates as the buffering solution for the net is based on the cost associated with each buffering candidate.

19. A computer-storage medium storing instructions, which when executed by a machine, cause the machine to perform operations comprising:
accessing, from memory, an integrated circuit (IC) design comprising a routing topology for a net, the net comprising interconnections between a set of pins, the routing topology comprising routing paths for the interconnections between the set of pins;
identifying a set of candidate insertion locations along the routing topology;
generating a set of buffering candidates based on the set of candidate insertion locations, a buffering candidate from the set of buffering candidates comprises a cell inserted at a candidate insertion location from among the set of candidate insertion locations along the routing topology;
determining, using a cost function, a cost associated with the buffering candidate based on an average number of potential edge spacing conflicts associated with the buffering candidate and an average number of stack vias associated with the buffering candidate, the determining of the cost associated with the buffering candidate comprises:
determining the number of potential edge spacing conflicts associated with the buffering candidate based on one or more edge spacing constraints associated with the cell; and
determining the number of stack vias associated with the buffering candidate based on a stack via constraint associated with the cell;
selecting a buffering solution from the set of buffering candidates based on the cost associated with each of the buffering candidates; and generating a layout instance for the IC design based in part on the buffering solution, the layout instance describing physical layout dimensions of the IC.

20. The computer-storage medium of claim 19, wherein the determining of the cost associated with the buffering candidate further comprises:
- dividing the net into multiple placement bins;
- identifying a placement bin in which the candidate insertion location is located;
- determining a total number of potential edge spacing conflicts associated with the placement bin based on additional edge spacing constraints associated with cells in the placement bin;
- determining a total number of stack via associated with the the placement bin based on one or more stack via constraints associated with the cells in the placement bin;
- determining the average number of potential edge spacing conflicts associated with the net; and
- determining the average number of stack vias associated with the net.

\* \* \* \* \*